US011783854B1

(12) United States Patent  
Rajauria et al.

(10) Patent No.: US 11,783,854 B1  
(45) Date of Patent: Oct. 10, 2023

(54) DATA STORAGE DEVICE WITH DETECTION AND MITIGATION OF NON-NOMINAL HEAD HEAT DISSIPATION

(71) Applicant: WESTERN DIGITAL TECHNOLOGIES, INC., San Jose, CA (US)

(72) Inventors: Sukumar Rajauria, San Jose, CA (US); Robert Lee Smith, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/804,490

(22) Filed: May 27, 2022

(51) Int. Cl.  
    *G11B 5/40*     (2006.01)  
    *G11B 33/14*     (2006.01)  
    *G11B 5/56*     (2006.01)

(52) U.S. Cl.  
    CPC ............... *G11B 5/40* (2013.01); *G11B 5/56* (2013.01); *G11B 33/144* (2013.01)

(58) Field of Classification Search  
None  
See application file for complete search history.

(56) References Cited

U.S. PATENT DOCUMENTS

| | | | | |
|---|---|---|---|---|
| 5,527,110 A * | 6/1996 | Abraham | ........... | G11B 17/32 |
| 6,433,310 B1 * | 8/2002 | Wickramasinghe | ........... | G11B 9/1409 |
| 6,920,088 B2 * | 7/2005 | Wickramasinghe | ........... | G11B 9/1418 977/947 |
| 7,124,625 B1 * | 10/2006 | Kurita | ........... | G11B 5/4555 73/104 |
| 7,724,463 B2 * | 5/2010 | Nakamura | ........... | G11B 5/41 360/75 |
| 8,264,917 B2 * | 9/2012 | Nakano | ........... | G11B 5/09 369/13.13 |
| 8,653,824 B1 * | 2/2014 | Liu | ........... | G11B 5/455 360/234.3 |
| 8,654,618 B1 * | 2/2014 | Liu | ........... | G11B 5/607 369/13.33 |
| 9,036,307 B1 | 5/2015 | Hoshiya et al. | | |
| 9,117,474 B1 * | 8/2015 | Contreras | ........... | G11B 5/6076 |
| 9,916,847 B1 | 3/2018 | Granz et al. | | |
| 10,283,145 B2 | 5/2019 | Rajauria et al. | | |
| 10,410,656 B1 * | 9/2019 | Guo | ........... | G11B 5/012 |

(Continued)

OTHER PUBLICATIONS

Cheng et al.—Experimental study of smear formation and removal in heat-assisted magnetic recording; Tribology International 165 (2022) 107258; 7 pages.

(Continued)

*Primary Examiner* — Peter Vincent Agustin  
(74) *Attorney, Agent, or Firm* — CALDERON SAFRAN & COLE PC

(57) ABSTRACT

Various illustrative aspects are directed to a data storage device, comprising one or more disks; a head, configured to be positioned proximate to a disk surface among the one or more disks; a temperature sensor; and one or more processing devices. The one or more processing devices are configured to: detect, via the temperature sensor, a non-nominal heat dissipation of a portion of the head; and, in response to detecting the non-nominal heat dissipation of the portion of the head, mitigate the non-nominal heat dissipation of the portion of the head.

20 Claims, 4 Drawing Sheets

(56) References Cited

U.S. PATENT DOCUMENTS

| | | | |
|---|---|---|---|
| 10,629,236 B1 | 4/2020 | Liu et al. | |
| 10,699,736 B1 | 6/2020 | Rajauria et al. | |
| 11,257,525 B1 | 2/2022 | Rajauria et al. | |
| 2003/0156340 A1* | 8/2003 | Jen | B82Y 10/00 360/75 |
| 2004/0075940 A1* | 4/2004 | Bajorek | G11B 5/105 360/110 |
| 2005/0237885 A1* | 10/2005 | Ma | G11B 7/00456 |
| 2008/0049351 A1* | 2/2008 | Yamanaka | G11B 5/6064 |
| 2009/0296257 A1* | 12/2009 | Nakano | G11B 5/09 360/71 |
| 2011/0116184 A1* | 5/2011 | Yasui | G11B 5/02 360/110 |
| 2013/0163111 A1* | 6/2013 | Albrecht | G11B 5/746 360/234.3 |
| 2017/0221511 A1* | 8/2017 | Dai | G11B 5/41 |

OTHER PUBLICATIONS

Trinh et al.—Temperature Induced Near-field Transducer (NFT) Failure in Heat-assisted Magnetic Recording (HAMR); DOI 10.1109/TMAG.2020.2986987, IEEE Transactions on Magnetics; 2015; 4 pages.

Kiely et al.—Write-Induced Head Contamination in Heat-Assisted Magnetic Recording; IEEE Transactions on Magnetics, vol. 53, No. 2, Feb. 2017; 7 pages.

Xiong et al.—Setting Write Spacing in Heat Assisted Magnetic Recording; IEEE Transactions on Magnetics, vol. 54, No. 8, Aug. 2018; 7 pages.

Smith et al.—Opto-Thermal Simulation of Metallic Smear's Impact on HAMR Technology; Western Digital Corporation, San Jose, CA, USA, 2021; 2 pages.

Xiong et al.—Experimental Study of Material Pick Up on Heat-Assisted Magnetic Recording (HAMR) Heads; Tribology Letters (2021) 69:77 https://doi.org/10.1007/s11249-021-01455-5; 7 pages.

* cited by examiner

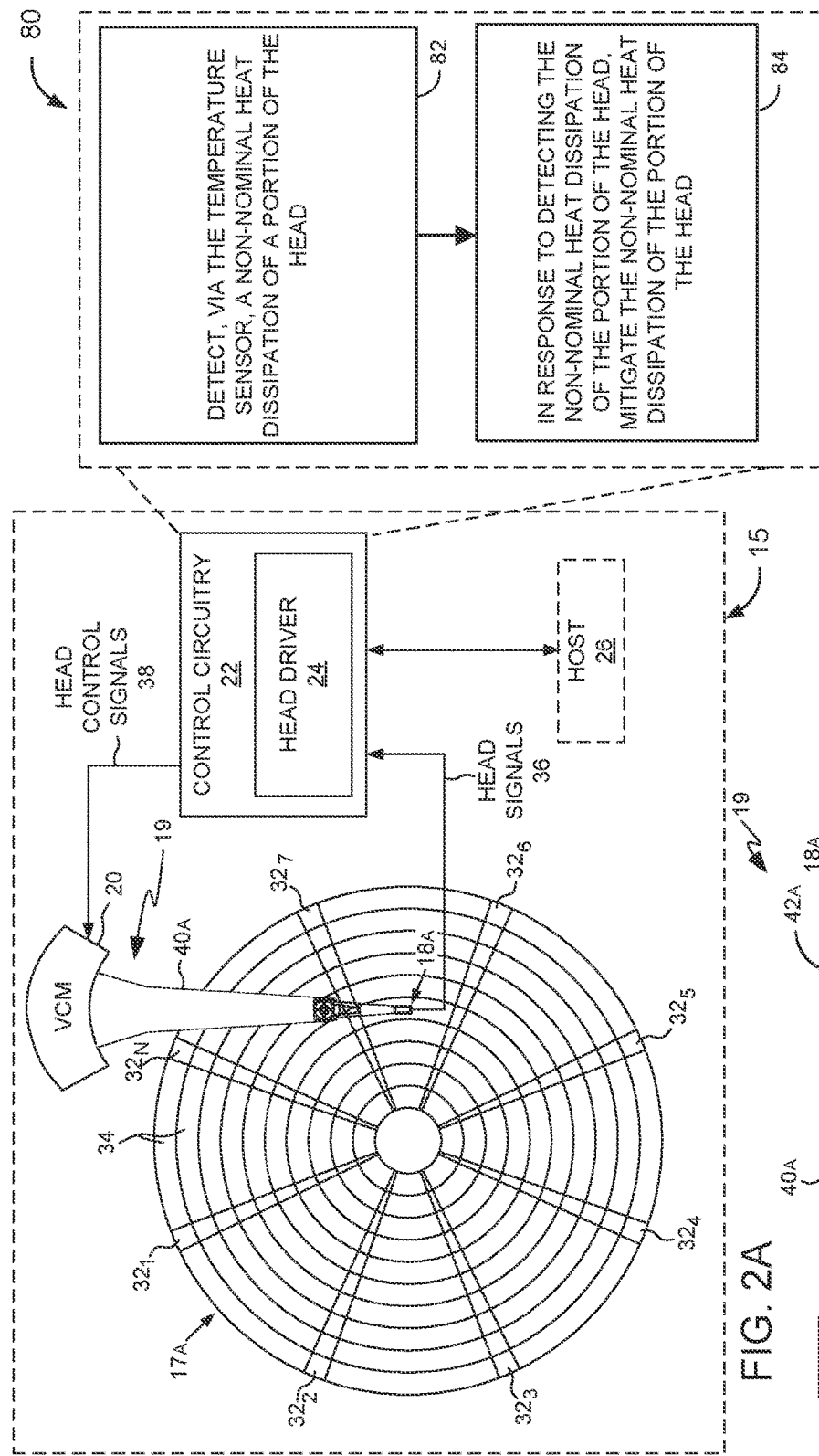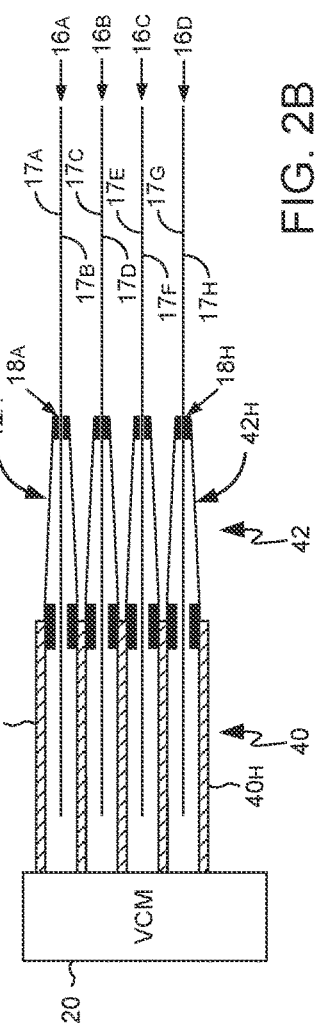

DATA STORAGE DEVICE WITH DETECTION AND MITIGATION OF NON-NOMINAL HEAD HEAT DISSIPATION

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 6. Each servo wedge $6_1$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more fine actuators, in some examples.

A disk drive may write data to a disk by modulating a write current in an inductive write coil to record magnetic transitions onto the disk surface. During a read operation, a magneto-resistive or other read element may sense magnetic transitions, and the resulting read signal may be demodulated by a suitable read channel. A heat-assisted magnetic recording (HAMR) disk drive may use disk surfaces that enable stable, high data density by requiring heating to be written to, and use HAMR heads that apply heating to a track during write operations, such as via the head applying a laser-induced plasmon to a track shortly before the write head writes to the track, to enable magnetizing and writing to the track, before the track so encoded quickly cools back below the temperature at which it is write-susceptible, thereby stably encoding the data and control patterns thus written.

SUMMARY

Various examples disclosed herein provide data storage devices such as hard disk drives that detect and mitigate changes in the heat dissipation of energized and heated portions of a read/write head, thereby guarding against degradation of the heads and reducing the risk of failure of a disk drive, as well as the risk of unanticipated failure of a disk drive, among other aspects. Control circuitry of a disk drive of this disclosure may intermittently measure the relation of temperature of an applicable portion of a head that comprises an energizing component, such as a laser unit and a near-field transmitter (NFT) used in a HAMR head, to current applied to the laser unit or other energizing component, where this temperature-current relation may be graphically represented as a line segment at different directly proportional values of temperature per current. This relation, corresponding to such a linear proportional slope, may serve as a reliable indicator of the heat dissipation of the relevant or applicable portion of the head, even where the underlying values of temperatures and currents may vary significantly depending on individual conditions or units and may not be a reliable indicator.

The heat dissipation of the head may evolve over time away from its nominal range of heat dissipation, due to any of a number of cumulative physical effects over time on the head, which may be a complex and nanoscopic component. Evolution into a non-nominal heat dissipation may invoke any of a number of non-nominal thermal, electrodynamic, and other effects on the head and its operation, which may raise any of a number of unintended factors and risks that may erode the performance of the head or pose a risk of inter-related and cascading degradation and failure of the head, and total failure of the disk drive. Control circuitry of the disk drive may detect such evolution of the heat dissipation of the head to a non-nominal value, either higher or lower than the nominal range of the heat dissipation, and may perform one or more actions to mitigate the change to the non-nominal heat dissipation, in accordance with various examples of this disclosure. By so doing, a disk drive of this disclosure may remedy ill effects to the head over time, prolong the nominal operation of the head and the disk drive, and in some cases in which other mitigation steps don't succeed, a disk drive of this disclosure may signal its own heightened risk of imminent failure, and enable its data to be backed up with plenty of advance warning and in an orderly manner.

Various illustrative aspects are directed to a data storage device, comprising one or more disks; a head, configured to be positioned proximate to a disk surface among the one or more disks; a temperature sensor; and one or more processing devices. The one or more processing devices are configured to: detect, via the temperature sensor, a non-nominal heat dissipation of a portion of the head; and, in response to detecting the non-nominal heat dissipation of the portion of the head, mitigate the non-nominal heat dissipation of the portion of the head.

Various illustrative aspects are directed to a method comprising: detecting, by one or more processing devices, via a temperature sensor, a non-nominal heat dissipation of a portion of a head, wherein the head is configured to be positioned proximate to a disk surface among one or more disks; and, in response to detecting the non-nominal heat dissipation of the portion of the head, mitigating, by the one or more processing devices, the non-nominal heat dissipation of the portion of the head.

Various illustrative aspects are directed to a one or more processing devices comprising: means for detecting, via a temperature sensor, a non-nominal heat dissipation of a portion of a head, wherein the head is configured to be positioned proximate to a disk surface among one or more disks; and means for mitigating, in response to detecting the non-nominal heat dissipation of the portion of the head, the non-nominal heat dissipation of the portion of the head.

Various further aspects are depicted in the accompanying figures and described below, and will be further apparent based thereon.

BRIEF DESCRIPTION OF THE DRAWINGS

Various features and advantages of the technology of the present disclosure are apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

FIGS. 2A and 2B illustrate conceptual block diagrams of a top view and a side view of a data storage device in the form of a disk drive, in accordance with aspects of the present disclosure.

FIG. 2C depicts a flowchart for an example method that control circuitry of a disk drive, including one or more head drivers, may perform or execute in controlling the operations of the disk drive, including the operations of heads, in accordance with aspects of the present disclosure.

DETAILED DESCRIPTION

Figure 1:
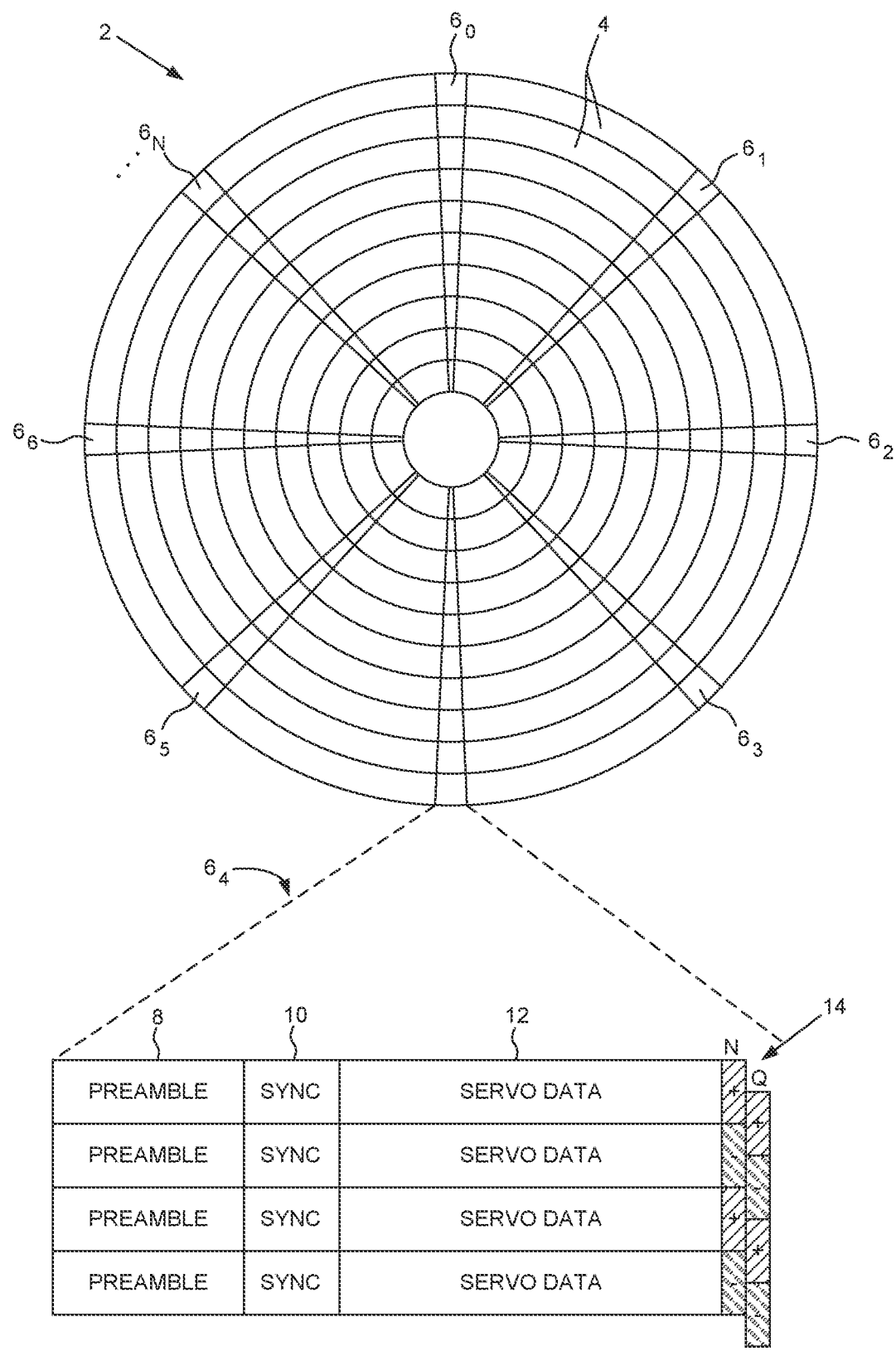
FIG. 1 shows a prior art disk format as comprising a number of radially-spaced, concentric servo tracks defined by servo wedges recorded around the circumference of each servo track.

FIGS. 2A and 2B illustrate conceptual block diagrams in a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("hard disks 16"). FIG. 2C depicts a flowchart for an example method 80 that control circuitry 22 of disk drive 15, including one or more head drivers 24, may perform, execute, and/or embody in controlling the operations of disk drive 15, including the operations of read/write heads 18A through 18H ("heads 18") of disk drive 15 and of components of heads 18, including for detecting and mitigating non-nominal heat dissipation of portions of heads 18, in accordance with aspects of the present disclosure.

Actuator arm assembly 19 comprises a primary actuator 20 (e.g., a voice coil motor ("VCM")) and a number of actuator arms 40 (e.g., topmost actuator arm 40A, as seen in the views of FIGS. 2A and 2B; lowest actuator arm 40H, as seen in the view of FIG. 2B). Each of actuator arms 40 comprises a suspension assembly 42 at a distal end thereof (e.g., example topmost suspension assembly 42A comprised in topmost actuator arm 40A, in the views of FIGS. 2A and 2B; lowest suspension assembly 42H comprised in lowest actuator arm 40H, as seen in the view of FIG. 2B). Each suspension assembly 42 may comprise one or more additional auxiliary actuators, in some examples.

Each of actuator arms 40 is configured to suspend a head 18 in close proximity over a corresponding disk surface 17 (e.g., read/write head 18A suspended by topmost actuator arm 40A over topmost corresponding disk surface 17A; read/write head 18H suspended by lowest actuator arm 40H over lowest corresponding disk surface 17H, as referenced relative to the orientation of FIG. 2B). In various examples, a disk drive of this disclosure may include any of a wide variety of other numbers of hard disks and disk surfaces, and other numbers of actuator arm assemblies and/or actuators, in any of a variety of arrangements, besides the one actuator arm assembly 19 and the one primary actuator 20 in the example of FIGS. 2A and 2B, for example.

Head 18A comprises various features that are too small to be individually depicted in the scale of the view of FIGS. 2A and 2B, are introduced as follows, and are further described below with reference to subsequent figures, and in which head 18A may serve as an illustrative example of heads 18. Head 18A may comprise a write element such as a write coil configured to write data to the corresponding disk surface 17, and a read element such as a magnetoresistive (MR) element or magnetic tunneling junction (MTJ) element configured to read data from the corresponding disk surface 17. Head 18A may include an air bearing surface (ABS) facing disk surface 17A, which may interact with the ambient air flow between head 18A and proximate corresponding disk surface 17A in motion proximate to head 18A within disk drive 15, to form an air bearing out of the flow of air between head 18A and corresponding disk surface 17A, which helps support head 18A in position over corresponding disk surface 17A. Head 18A may include an energizing component, a temperature sensor, and active flight control elements, such as one or more thermal fly height control (TFC) elements (further discussed below), which head driver 24 of control circuitry 22 may control to operate head 18A at targeted precision fly heights above disk surface 17A. The energizing component may assist with performing write operations to disk surface 17A, and may include, for example, a laser unit and a near-field transmitter (NFT) used in heat-assisted magnetic recording (HAMR), as further described below. The temperature sensor may be positioned on head 18A proximate to the energizing component and may be disposed and configured to detect a temperature of a portion of head 18A that comprises or is proximate to the NFT or other energizing component or sub-component, as further described below.

In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, including head driver 24; and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure as it is configured in itself, without any operation of software, in various examples. Control circuitry 22 may be operatively in communicative and/or control connection or coupling with a host 26, which may include any external processing, computing, and/or data management entity, such as a computing device, a storage area network, a data center, a cloud computing resource of any kind, and/or any other kind of host, in various examples.

Control circuitry 22 may comprise one or more processing devices that constitute device drivers, specially configured for driving and operating certain devices. Such device drivers may comprise head driver 24, or multiple head drivers in various examples, configured for driving and operating heads 18. Head driver 24 may be configured as one or more integrated components of one or more larger-scale circuits, such as one or more power large-scale integrated circuit (PLSI) chips or circuits, and/or as part of control circuitry 22, in various examples. Head drivers 24 may also be configured as components in other large-scale integrated circuits such as system on chip (SoC) circuits, or as more or less stand-alone circuits, which may be operably coupled to other components of control circuitry 22, in various examples. Any operations described herein with reference to head driver 24 and/or any other components, elements, or aspects of control circuitry 22 may be performed, executed, and/or embodied in any one or more processing devices of control circuitry 22 or otherwise of disk drive 15, in various examples.

Primary actuator 20 may perform primary, macroscopic actuation of a plurality of actuator arms 40, each of which may suspend one or more of heads 18, e.g., head 18A, over and proximate to corresponding disk surfaces 17 of disks 16. The positioning range of heads 18 are generally suggested in FIGS. 2A and 2B, and may extend over substantially the entirety of the corresponding disk surfaces 17, in various examples. Disk drive 15 generally positions heads 18 very close to the disk surfaces, such as within a few nanometers, during write and read operations, in various examples.

Example disk drive 15 of FIGS. 2A and 2B comprises four hard disks 16. Other examples may comprise any number of disks, such as just one disk, two disks, three disks, or five or more disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example.

Actuator arm assembly 19 suspends each of heads 18 of each actuator arm 40 "over" and proximate to a corresponding disk surface 17, enabling each head 18 to write control features and data to, and read control features and data from, its respective, proximate disk surface 17. In this sense, each head 18 of each actuator arm 40 interacts with a corresponding disk surface 17.

The term "disk drive surface" may be understood to have the ordinary meaning it has to persons skilled in the applicable engineering fields of art. The term "disk drive surface" may be understood to comprise both the very outer surface layer of a disk drive as well as a volume of disk drive matter beneath the outer surface layer, which may be considered in terms of atomic depth, or (in a greatly simplified model) the number of atoms deep from the surface layer of atoms in which the matter is susceptible of physically interacting with the heads. The term "disk drive surface" may comprise the portion of matter of a disk 16 that is susceptible of interacting with a corresponding head 18 in disk drive operations, such as control write operations, control read operations, data write operations, and data read operations, for example.

In the embodiment of FIGS. 2A and 2B, each disk surface, e.g., disk surface 17A as shown in FIGS. 2A and 2B, comprises a plurality of control features. The control features comprise servo wedges $32_1$-$32_N$, which define a plurality of servo tracks 34, wherein data tracks are defined relative to the servo tracks 34, and which may be at the same or different radial density. Control circuitry 22 may process read signals among head signals 36 emanating from each respective head 18, e.g., head 18A, to read from disk surface 17A, to demodulate the servo wedges $32_1$-$32_N$ and generate a position error signal (PES) representing an error between the actual position of head 18 and a target position relative to a target track. A servo control system in control circuitry 22 filters the PES from the servo wedges using a suitable compensation filter to generate a positioning control signal among head control signals 38 that head driver 24 and control circuitry 22 apply to actuator arm assembly 19 and head 18, including to control actuator 20, which functions as a primary actuator, and which rotates actuator arm assembly 19 about an axial pivot in order to perform primary actuation of the corresponding heads radially over the disk surfaces 17 in a direction that reduces the PES, as well as to control any fine actuators, in various examples. Head driver 24 and control circuitry 22 may also apply control signals such as current applied to laser units of heads 18 among head control signals 38, and may also receive temperature sensor signals from temperature sensors comprised in heads 18 among head signals 36, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. Other examples may employ more than two actuator arm assemblies or primary actuators or multi-actuators, which may be actuated about a common pivot, or which may be comprised in multiple multi-actuators mounted at different circumferential locations about the disks, in various examples.

In executing example method 80 of FIG. 2C (aspects of which are also further explained below with reference to the subsequent figures), head driver 24 and/or other components of control circuitry 22 may issue one or more commands to other components of disk drive 15, receive information from one or more other components of disk drive 15, and/or perform one or more internal operations, such as generating one or more driver currents for outputting to system components of disk drive 15. In particular, a head driver 24 among one or more drivers of control circuitry 22 may detect, via a temperature sensor, different temperatures corresponding to different levels of current applied to a laser, and may thereby detect a heat dissipation of a portion of head 18A, including detecting a non-nominal heat dissipation of a portion of head 18A (82), in various examples, and as further described below. Control circuitry 22 may further, in response to detecting the non-nominal heat dissipation of the portion of head 18A, mitigate the non-nominal heat dissipation of the portion of head 18A (84), in various examples, and as further described below.

Figure 3:
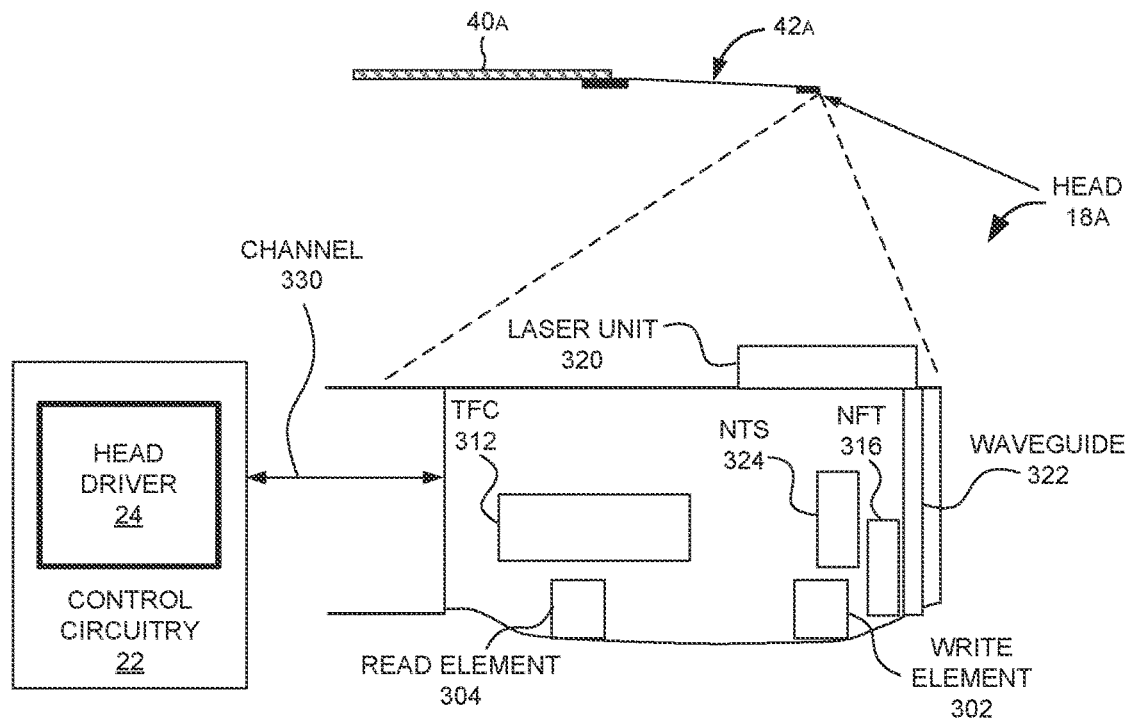
FIG. 3 illustrates a conceptual side view diagram of a head, both in the same context as in FIG. 2B and on a scale magnified many orders of magnitude relative to the scale of FIG. 26, illustrating individual components thereof, in accordance with aspects of the present disclosure.

FIG. 3 illustrates a conceptual side view diagram of head 18A both in the same context as in FIG. 2B (upper part of FIG. 3), and on a scale magnified by orders of magnitude relative to the scale of FIG. 2B (lower/main body of FIG. 3), conceptually illustrating individual components of head 18A, in accordance with aspects of the present disclosure. Control circuitry 22 may be configured to interact with head 18A to detect heat dissipation of a portion of head 18A, and whether such heat dissipation of a portion of head 18A are nominal or non-nominal. If and when control circuitry 22 detects a non-nominal heat dissipation of a portion of head 18A, control circuitry 22 may be configured to interact further with head 18A to mitigate the non-nominal heat dissipation of the portion of head 18A, in various examples.

Head 18A is suspended on actuator arm 40A and suspension assembly 42A (upper part of FIG. 3). Head 18A is operatively or communicatively coupled or connected with head driver 24 and the rest of control circuitry 22 via channel 330. Channel 330 may include individual communication channels and operational channels (e.g., to apply current to individual components of head 18A) with, to, and/or from various components of head 18A.

Head 18A comprises a write element 302, a laser unit 320, a waveguide 322, a near-field transducer 316 ("NFT 316") adjacent or proximate to write element 302 and coupled to laser unit 320 via waveguide 322, and an NFT temperature sensor (NTS) 324 ("NTS 324") adjacent or proximate to NFT 316, in accordance with aspects of the present disclosure. Head 18A further comprises a read element 304 and one or more thermal fly height control (TFC) elements 312 ("TFC element 312"). Write element 302, read element 304, TFC element 312, laser unit 320, and NTS 324 may be operatively connected via channel 330 with control circuitry 22, including with head driver 24 comprised in control circuitry 22, and may be configured for operative communication and transmission of control signals and/or data with control circuitry 22 and with head driver 24 in particular, in various examples. Channel 330 may include a number of wires and/or lines enabling transmission of one or more currents, voltages, optical transmissions, and/or any other type of physical phenomena that may serve as communication signals and/or power sources, in various examples.

The various features shown in FIG. 3 are conceptual depictions and not necessarily to scale. The scale of features depicted may be on the order of single-digit nanometers, in various examples. The features depicted may also be on the order of other scales in various examples, such as on the order of tens of nanometers, or on the order of single-digit angstroms (and thus on the order of single-digit numbers of atoms), in various examples. Features of write element 302 and/or surrounding portions of head 300 may be composed of materials suitable for the properties and behavior described herein, such as gold, silver, copper, similar materials, and/or alloys thereof, which are relatively deformable, in some examples. The scale of features depicted may be close enough to atomic scales that the properties and behavior of write element 302 and proximate surfaces and volumes of head 300 may be significantly a matter of condensed matter physics and atomic physics rather than macroscopic mechanical engineering alone.

Head driver 24 and/or other elements of control circuitry 22 of disk drive 15 may be configured to activate, output, apply, and deliver a current via channel 330 to laser unit 320, prior to and/or as part of performing write operations, and prior to and/or as part of measuring temperature via NTS 324 as described herein. Head driver 24 and/or other elements of control circuitry 22 of disk drive 15 may be configured to receive temperature measurements or readings from NTS 324, and thereby to detect a heat dissipation/detect a value of a heat dissipation of at least a portion of head 18A, in various examples, as further described below. NTS 324 may convey a signal indicative of temperature back to control circuitry 22 via channel 330, in the form of a voltage, a current, or any other type of signal. Control circuitry 22 may apply different levels of current to laser unit 320 and take measurements of temperature via NTS 324 after waiting more or less of an interval for the current and its effects, including on the temperature, may come into a steady state, or more or less into enough of a steady state as is applicable to operation of head 18A, in various examples. Disk drive 15 may include other forms and configurations of one or more temperature sensors anywhere on, proximate to, or around head 18A or elsewhere in disk drive 15 and configured to detect temperatures of at least a portion of head 18A, in various examples, as further described below.

A data storage device in the form of disk drive 15 may thus comprise one or more disks 16, and one or more heads 18 including head 18A, configured to be positioned proximate to corresponding disk surfaces including corresponding disk surface 17A among one or more disks 16. Head 18A may thus comprise an energizing component, where the energizing component may comprise laser unit 320 and/or NFT 316 coupled to laser unit 320, in various examples. Disk drive 15 may thus comprise a temperature sensor, such as NTS 324 comprised in head 18A, and one or more processing devices, such as control circuitry 22 comprising driver 24. Driver 24 and/or other processing devices of control circuitry 22 may be configured to detect, via NTS 324 or other temperature sensor, a non-nominal heat dissipation of a portion of head 18A, such as a portion of head 18A that comprises and/or is proximate to NFT 316, laser unit 320, and/or other energizing component. Driver 24 and/or other processing devices of control circuitry 22 may be configured to, in response to detecting the non-nominal heat dissipation of the portion of head 18A, mitigate the non-nominal heat dissipation of the portion of head 18A. NTS 324 or other temperature sensor may be positioned on head 18A proximate to NFT 316, laser unit 320, and/or other energizing component, in various examples.

Laser unit 320 and NFT 316 may collectively be considered an energizing component. Laser unit 320 and NFT 316 may also each be considered an energizing component, which may also be part of or comprised in an overall energizing component. In other examples, disk drive 15 may be configured for microwave-assisted magnetic recording (MAMR). In these examples, a head may comprise an energizing component that comprises a microwave unit and/or a magnetic spin torque oscillator unit, instead of a laser unit and an NFT. In these examples, a head may also include a temperature sensor positioned proximate to a microwave magnetic spin torque oscillator unit or component or other microwave unit, and may detect temperatures of a portion of the head that comprises and/or is proximate to an energizing component in the form of or that comprises the microwave unit or other magnetic spin torque oscillator unit or component.

In various other examples, an energizing component may comprise any component configured to receive a current or any other form of energy applied thereto by control circuitry and/or other component of a disk drive of this disclosure, and to transform, transmit, and/or handle any form of energy. An energizing component of a head of a disk drive of the present disclosure may thus include any form of component that may be subjected to an energy input that may involve or implicate at least an iota or quantum of applied energy becoming introduced as thermal energy to any portion of a head of the disk drive. Any such form of thermal energy may thereafter affect the dimensions, configuration, flight control surfaces or properties, or other characteristics of a head, and may undergo a heat dissipation process over time, which may further affect characteristics of the head. Any such energy application to the head may thus also exert an effect on the flight control properties of the head and/or otherwise exert an effect on the precision or capability with which control circuitry and/or other components of a disk drive of this disclosure may write and/or read with the head.

The nominal operation of head 18A relies on head 18A nominally dissipating heat away from a portion of head 18A comprising one or more energized components such as laser unit 320 and NFT 316 at a nominal heat dissipation. Laser unit 320 may be configured to emit a laser coupled through a waveguide of NFT 316 to induce a small, precision plasmon directed at disk surface 17A, for purposes of heat-assisted magnetic recording. The plasmon may heat a nominal small portion along a track of disk surface 17A (including what may newly become defined by a track along disk surface 17A by the write operation initiated by such heating) at any one time up to write temperature, shortly before write element 302 encounters and writes to the heated portion of the track. Disk surface 17A may be configured with significant magnetic coercivity within a nominal operating temperature range to help enable the stability of magnetic bits at high areal density. During a write operation, laser unit 320 and NFT 316 may add thermal energy to a small area of disk surface 17A at a time, thereby elevating the temperature of that area of disk surface 17A and reducing the energy required to reorient the magnetization of that area of disk surface 17A in alignment with a magnetic field imposed by write element 302. The new orientation of the magnetic domains in those small areas may then be induced by write element 302 to magnetically encode bits, as written by write element 302. As the thermal energy then dissipates from the areas of the written bits along the written track after the write operation, the new magnetic alignments of the small areas encoding those bits may become stably entrenched, ensuring stability of the data and/or control pattern thus written.

Maintaining precise control of the thermal properties of head 18A is important to ensure that head 18A remains at nominally and precisely controlled fly height above disk surface 17A, very close to disk surface 17A to enable strong write and read signals for very small bit areas, but without coming so close to disk surface 17A to risk head-disk contact, which can cause catastrophic damage, and sometimes even the complete loss of operability of disk drive 15.

One potential failure mode of head 18A and thus of disk drive 15 may be by evolution or degradation of the heat dissipation of the portion of head 18A comprising NFT 316 and/or laser unit 320, which may thereby induce unexpected and non-nominal changes in the properties of head 18A. Such unexpected and non-nominal changes in the properties of head 18A may also in turn degrade the susceptibility of head 18A of responding nominally and precisely to control signals by head driver 24 and/or the rest of control circuitry 22, and may potentially cause head 18A to respond unexpectedly and unpredictably to control signals from head driver 24 and/or the rest of control circuitry 22. Such non-nominal and imprecise responses to control by head driver 24 may in turn result in head 18A operating at insufficient write and read signal strength and poor performance in writing and reading data and control features, or worse, may lead to heightened risk of head-disk contact, and may lead to catastrophic head-disk crash and failure of disk drive 15.

Heat dissipation during write operations may be determined from a fixed proportionality relation of temperature detected by NTS 324 with the laser current, i.e., the current that head driver 24 delivers to laser unit 320 to operate the laser during write operations. The basis for this relation is that, after the laser current is high enough to surpass the laser threshold, the higher the laser current, the higher the temperature detected by NTS 324, which may substantially be the temperature of the portion of the write head that comprises NFT 316 and/or laser unit 320, with a substantially proportional relation between laser current and temperature of this applicable portion of head 18A, as explained further below with reference to FIG. 4. The "applicable portion of head 18A" may be used herein to indicate any portion of head 18A in accordance with various definitional criteria that may typically include NTS 324 and may include or be proximate to one or more energizing units proximate to NTS 324, such as NFT 316 and/or laser unit 320, in various examples. The slope of the linear proportionality rate between laser current and temperature of the applicable portion of head 18A may thus indicate a given constant heat dissipation, in various examples.

Head 18A may be exposed to heat from various sources, including from energy applied by head driver 24 as current to laser unit 320 and NFT 316 and converted by these components from current to laser to plasmon, from aerodynamic friction with the ambient air within disk drive 15, from the ambient operating temperature of disk drive 15, and potentially from other sources. The thermal balance of head 18A may also be affected by conductive heat transport and dissipation from the localized hotter areas of the energizing components of NFT 316 and laser unit 320 to lower-temperature surrounding portions of head 18A, by radiative infrared heat loss into the ambient environment, and by convective cooling by the ambient flow of air, which may be entirely or substantially entirely helium, in various examples in which disk drive 15 may have a more or less purged internal environment of helium. The distribution of heat across head 18A may have substantial effects on the precision with which head driver 24 and/or the greater control circuitry 22 may control head 18A. Nominal precision control of head 18A may rely on the thermal properties of head 18A remaining in accordance with its nominal design, including nominal and well-understood effects on its properties at any given temperature.

The heat dissipation properties and the heat dissipation of head 18A may evolve over time during long-term operation of disk drive 15, which may, for example, be due to unintended accumulation of extraneous nanoscopic materials on surfaces thereof, and/or unintended mechanical deformation and/or chemical evolution of write element 302 or other components of head 18A, for example. The heat dissipation of head 18A and/or individual components thereof may become higher or lower over time. A shift to either higher or lower heat dissipation may interfere with nominal operation of head 18A, though a shift to lower dissipation may be more particularly problematic as it may mean the temperatures of portions of head 18A may rise to higher than their nominal upper limit, or spend more than nominal amounts of time in a high end of their nominal temperature range. Any unexpected thermal response in head 18A may affect the properties of head 18A and the precision with which head driver 24 may control head 18A. Head driver 24 may detect and compensate for relatively small unexpected shifts in the properties of head 18A, though within limits. Excessive temperatures of one or more portions of head 18A may induce degradation or damage to one or more components thereof. Control circuitry 22 of disk drive 15 may thus be configured to detect unexpected changes in the heat dissipation of one or more portions of head 18A, and to mitigate such changes in the heat dissipation of one or more portions of head 18A, in response to control circuitry 22 detecting such changes.

Figure 4:
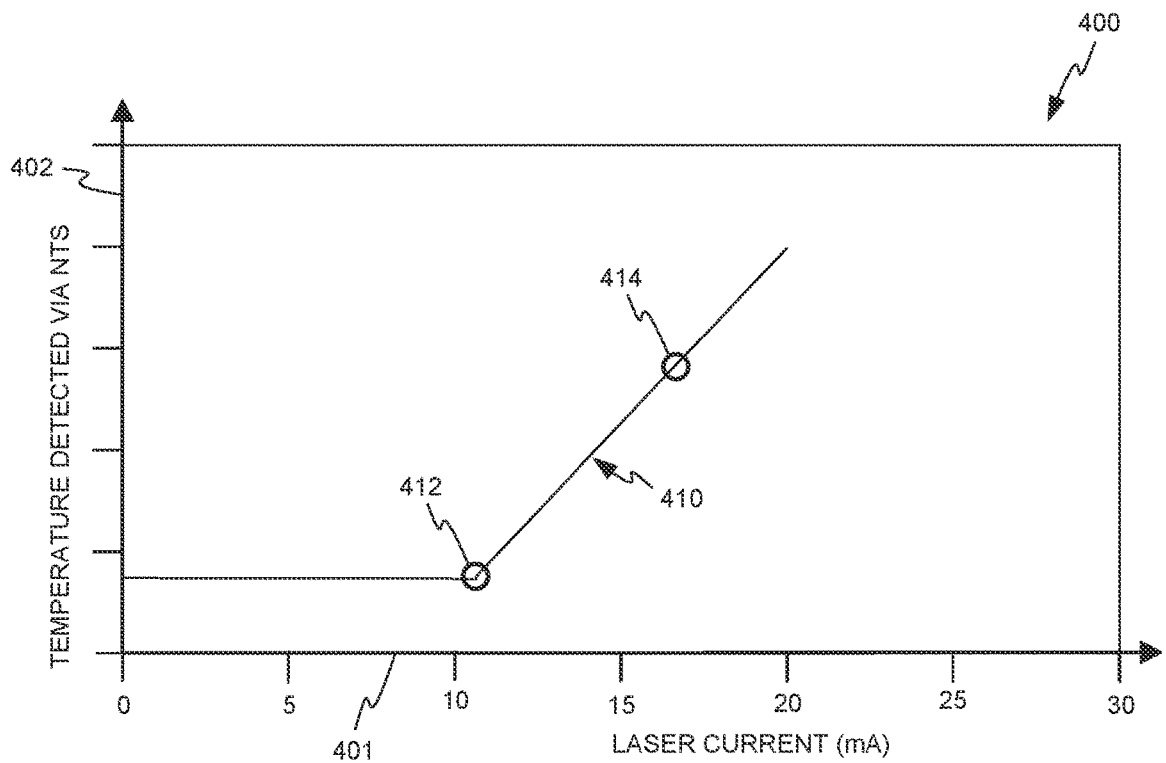
FIG. 4 depicts a graph of a nominal heat dissipation of a head, indicated by a relation of temperature relative to current applied to a laser unit, represented by the slope of a line segment, in which the relation is indicative of a nominal heat dissipation in the portion of head, in accordance with aspects of the present disclosure.

Control circuitry 22 may measure a relation of temperature as detected by NTS 324 of head 18A relative to current or power that head driver 24 applies to laser unit 320 of head 18A, above the threshold current for activating laser emission by laser unit 320. This relation of temperature to current or power, that is, of temperature as detected by NTS 324 relative to current or power that head driver 24 applies to laser unit 320, may be expressed as the slope of a line in a graph of temperature relative to current, as shown in FIG. 4 and as described below with reference thereto. Head driver 24 may apply current or power to laser unit 320, with the understanding that any reference herein to applying either current or power inherently may mean applying current or power or both to head 18A and to laser unit 320 thereof.

FIG. 4 depicts a graph 400 of a nominal heat dissipation of a head, indicated by a relation of temperature detected via NTS 324 relative to current applied to laser unit 320, represented by the slope of line segment 410, in which the relation is indicative of a nominal heat dissipation in the portion of head 18A comprising NFT 316 and NTS 324, in accordance with aspects of the present disclosure. That is, the relation of temperature detected via NTS 324 relative to current applied to laser unit 320, above the threshold current 412 for activating laser emission from laser unit 320, is linearly proportional and corresponds to a diagonal straight line segment 410 when the current-temperature relation is represented in graphical form as in graph 400, in this example. In graph 400, current applied by head driver 24 to laser unit 320, in milliamps, is shown on x-axis 401, and temperature detected via NTS 324, in arbitrary units, is shown on y-axis 402. Temperature is represented in arbitrary units because the temperature itself may vary between one head and another and may not be relied upon for information about heat dissipation, as opposed to the relation of temperature to current, as represented by the slope of line segment 410, in this example.

The overall current-temperature relation forms a "hockey stick" profile on either side of a laser emission activation threshold 412, which corresponds to a threshold current for activating laser emission of laser unit 320 (e.g., approximately 11 milliamps in the example shown in graph 400). At currents below the threshold current, the temperature detected by NTS 324 remains substantially constant and flat, in this example. Laser unit 320 itself may experience some heating if and when subjected to current levels below the threshold current, such as in case of pre-lasing, but such heating may be mild enough and laser unit 320 displaced enough from NTS 324 that it may not be significantly detected by NTS 324, in this example. Rather, NTS 324 is positioned proximate to NFT 316 and is intended to convey approximately the temperature of NFT 316, in this example, and potentially after a well-understood correction factor, in some examples. Above the laser emission threshold 412, the temperature-current relation is linearly proportional and corresponds to diagonal straight line segment 410, as indicated above, and includes nominal current operating point 414, which may correspond to a nominal current for performing write operations and a nominal temperature at NTS 324 during nominal write operations, in this example.

Figure 5:
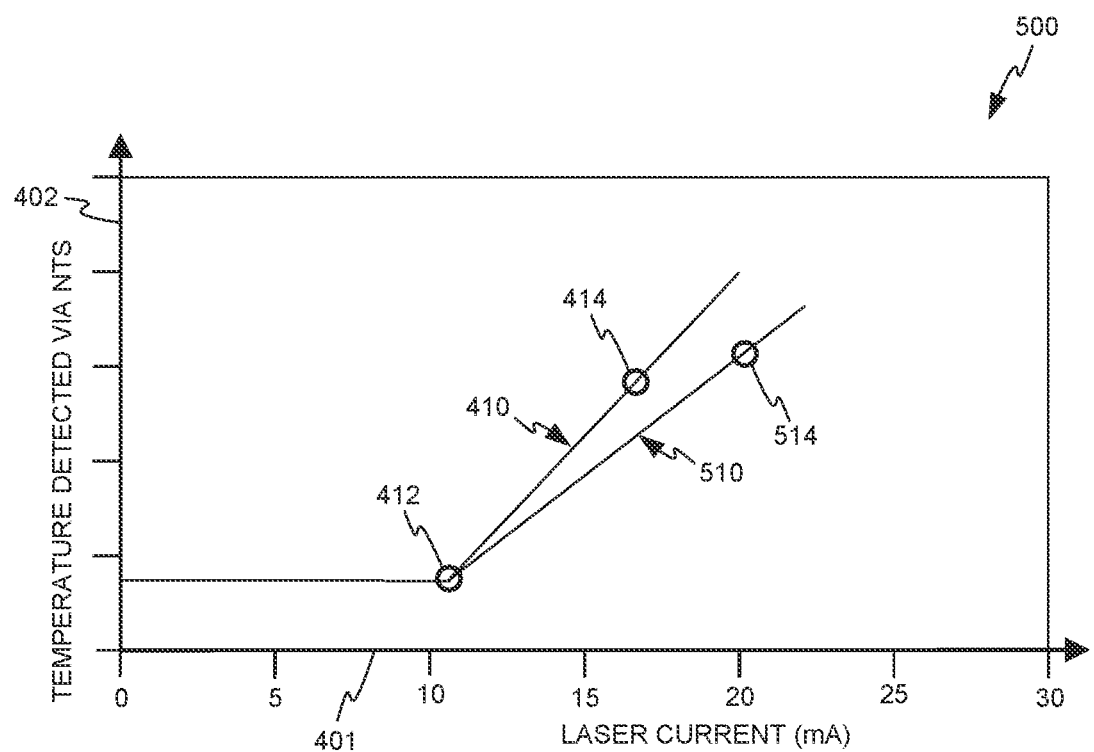
FIG. 5 depicts a graph of a non-nominal heat dissipation of a head, indicated as a non-nominal relation of temperature relative to current applied to a laser unit, represented by the slope of a line segment, in which the relation is indicative of a non-nominal heat dissipation in the portion of a head, in which the temperature increases, beyond the laser activation current, at a below-nominal dissipation relative to current applied to a laser unit, in accordance with aspects of the present disclosure.

FIG. 5 depicts a graph 500 of a non-nominal heat dissipation of a head, indicated as a non-nominal relation of temperature detected via NTS 324 relative to current applied to laser unit 320, represented by the slope of line segment 510, in which the relation is indicative of a non-nominal heat dissipation in the portion of head 18A comprising NFT 316 and NTS 324, in which the temperature detected via NTS 324 increases, beyond the laser activation current, at a below-nominal dissipation relative to current applied to laser unit 320, in accordance with aspects of the present disclosure. FIG. 5 also shows line segment 410 indicative of the nominal current-temperature relation for comparison. Line segment 510 has a lower slope than line segment 410, indicating lower steady-state temperatures for the same levels of current, and a faster or higher heat dissipation or higher value of heat dissipation of the portion of head 18A comprising NTS 324 and NFT 316.

FIG. 5 also shows an adjusted current operating point 514, which may correspond to an adjusted, higher current for performing write operations, which may be prior to or in the absence of control circuitry 22 performing any mitigation of the non-nominal heat dissipation of the applicable portion of head 18A, and a higher temperature at NTS 324 during such adjusted write operations, in this example. The effects of the non-nominal, higher heat dissipation and non-nominal temperatures (which may be higher or lower than nominal in different examples with non-nominally high heat dissipation) of the applicable portion of head 18A on the level of current that head driver 24 applies to laser unit 320 may involve a complex interplay of the thermal expansion, protrusion, and distance of write element 302 and NFT 316 away from disk surface 17A at a given current applied to laser unit 320, and adjustments that control circuitry 22 may make to the variables of operation of head 18A under its control, prior to or in the absence of any step to mitigate the non-nominal heat dissipation in the applicable portion of head 18A, in various examples. In one illustrative example, the higher heat dissipation and non-nominal temperatures of NFT 316 and the portion of head 18A proximate thereto for a given current may affect the thermal expansion and other properties of head 18A such that the portion thereof that comprises NFT 316 may be at a greater distance from disk surface 17A, and head driver 24 may compensate for this greater distance by elevating the current applied to laser unit 320 to increase the intensity of the laser emission to cause an increase in the energy of the resulting plasmon projected across the greater distance onto the disk surface 17A to achieve the same nominal heating of the track thereof to be written to. Yet, despite this compensation, such non-nominal operation may carry non-nominal effects and risks, such as higher uncertainty in the degree of heating of the disk surface, degraded ability to heat the surface, instability in touchdown power for TFC element 312, and/or higher uncertainty in fly height, as illustrative examples, and which may be remedied by performing mitigation of the non-nominal heat dissipation of the applicable portion of head 18A, in various examples of this disclosure.

Figure 6:
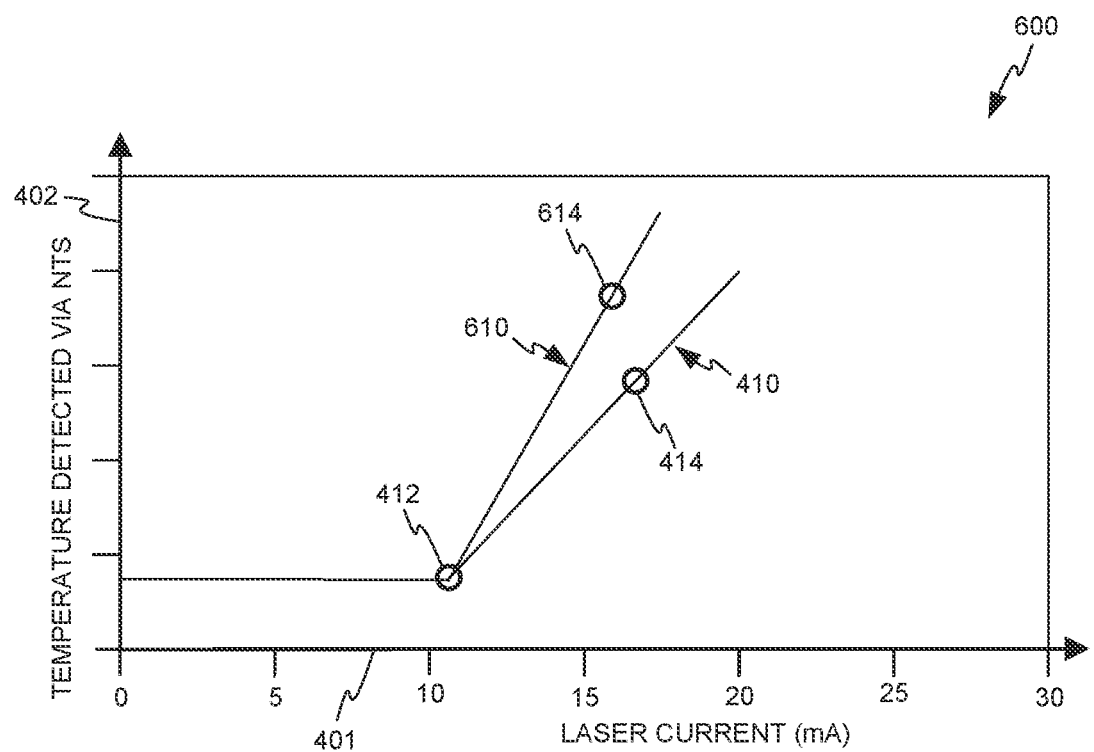
FIG. 6 depicts a graph of a non-nominal heat dissipation of a head, indicated as a non-nominal relation of temperature relative to current applied to a laser unit, represented by the slope of a line segment, in which the relation is indicative of a non-nominal heat dissipation in the portion of a head, in which the temperature increases, beyond the laser activation current, at an above-nominal dissipation relative to current applied to a laser unit, in accordance with aspects of the present disclosure.

FIG. 6 depicts a graph 600 of a non-nominal heat dissipation of a head, indicated as a non-nominal relation of temperature detected via NTS 324 relative to current applied to laser unit 320, represented by the slope of line segment 610, in which the relation is indicative of a non-nominal heat dissipation in the portion of head 18A comprising NFT 316 and NTS 324, in which the temperature detected via NTS 324 increases, beyond the laser activation current, at an above-nominal dissipation relative to current applied to laser unit 320, in accordance with aspects of the present disclosure. FIG. 6 also shows line segment 410 indicative of the nominal current-temperature relation for comparison. Line segment 610 has a higher slope than line segment 410, indicating higher steady-state temperatures for the same levels of current, and a lower heat dissipation of the portion of head 18A comprising NTS 324 and NFT 316. Again, the slope of the line segments 410 and 610 indicating the current-temperature relations are thus inversely proportional to the heat dissipation.

FIG. 6 also shows an adjusted current operating point 614, which may correspond to an adjusted, slightly lower current for performing write operations, prior to or in the absence of control circuitry 22 performing any mitigation of the non-nominal heat dissipation of the applicable portion of head 18A, and a significantly higher temperature at NTS 324, in this example. Different examples with lower than nominal heat dissipation may involve higher or lower than nominal applied current that result in a higher-than-nominal temperature, in various examples.

The effects of the non-nominal, lower heat dissipation and higher temperatures of the applicable portion of head 18A on the level of current that head driver 24 applies to laser unit 320 may, again, involve a complex interplay of the properties of the components of head 18A and properties of interaction of write element 302 and NFT 316 with disk surface 17A at a given current applied to laser unit 320, and potentially of distance of write element 302 and NFT 316 away from disk surface 17A at a given current applied to laser unit 320, as well as potential non-nominal thermal effects on one or more components of head 18A, and adjustments that control circuitry 22 may make to the variables of operation of head 18A under its control, prior to or in the absence of any step to mitigate the non-nominal heat dissipation in the applicable portion of head 18A, in various examples. In one illustrative example, the lower heat dissipation and higher temperatures of NFT 316 and the portion of head 18A proximate thereto for a given current may affect properties of head 18A such that the portion thereof that comprises NFT 316 is at a slightly lower distance from disk surface 17A. Such non-nominal operation may carry non-nominal effects and risks, such as higher uncertainty in the degree of heating of the disk surface, higher uncertainty in fly height, instability in touchdown power for TFC element 312, and/or thermal degradation of one or more components of head 18A, as illustrative examples, and which may be remedied by performing mitigation of the non-nominal heat dissipation of the applicable portion of head 18A, in various examples of this disclosure.

Therefore, in accordance with a variety of examples, control circuitry 22 of disk drive 15 may detect and mitigate a non-nominal heat dissipation of an applicable portion of head 18A. Control circuitry 22 detecting the non-nominal heat dissipation of the applicable portion of head 18A may include measuring a relation of temperature of the applicable portion of head 18A relative to current applied to an energizing component, such as laser unit 320, such that control circuitry 22 may thereby generate a measured relation of temperature of the applicable portion of head 18A relative to current applied to the energizing component such as laser unit 320, such as one of the example current-temperature relations graphically represented by line segments 410, 510, and 610 of FIGS. 4, 5, and 6, respectively. Control circuitry 22 may detect temperature via any means for detecting temperature. In some examples, control circuitry 22 may detect temperature via measuring a thermal resistor temperature as a function of current or power.

Control circuitry 22 may also measure the temperature at the applicable portion of head 18A at two or more values of fly height of head 18A, or in other words of clearance of head 18A above the corresponding disk surface, in various examples. Such measurements of temperature relative to fly height may be made independently of the measurements of temperature relative to different levels of current applied to laser unit 320 or other energizing component. Control circuitry 22 may use such measurements of temperature relative to fly height to determine whether and to what extent fly height and associated effects are an exogenous factor in heating the applicable portion of head 18A and that affect the heat dissipation of the applicable portion of head 18A and the corresponding relation of temperature to current as represented graphically as the slope of temperature plotted against current, separately from current applied to the energizing component, such as due to differential aerodynamic heating effects at different distances from the proximate disk surface, in various examples. Control circuitry 22 may use such determinations about fly height dependent aerodynamic heating of head 18A to apply a correction factor is needed in analyzing a relation of current applied to the energizing component to temperature of the applicable surface of head 18A, in some examples. Control circuitry 22 may thus measure the relation of temperature of the applicable portion of head 18A relative to current applied to the energizing component at two or more levels of fly height of head 18 above the disk surface, and correct for an independent effect on temperature of the applicable portion of head 18A due to the fly height of the head above the disk surface, or otherwise correct for an effect on temperature of the applicable portion of head 18A, based at least in part on the measured relation of temperature of the applicable portion of head 18A relative to current applied to the energizing component at the two or more levels of fly height of head 18A above disk surface 17A, in various examples.

Control circuitry 22 detecting the non-nominal heat dissipation of the applicable portion of head 18A may include comparing the measured relation of temperature of the applicable portion of head 18A relative to current applied to the energizing component such as laser unit 320 to a nominal reference relation of temperature of the applicable portion of head 18A relative to current applied to the energizing component such as laser unit 320, in various examples. Control circuitry 22 may keep the nominal reference relation of temperature of the applicable portion of head 18A relative to current applied to the energizing component such as laser unit 320 stored in its memory, in various examples. Control circuitry 22 may initially record the nominal reference relation of temperature of the applicable portion of head 18A relative to current applied to the energizing component such as laser unit 320 as part of the process of manufacturing and initializing disk drive 15, in various examples.

Control circuitry 22 detecting the non-nominal heat dissipation of the applicable portion of head 18A may include control circuitry 22 detecting a difference between the measured relation of temperature of the applicable portion of head 18A relative to current applied to the energizing component such as laser unit 320, and a nominal reference relation of temperature of the applicable portion of head 18A relative to current applied to the energizing component such as laser unit 320, in various examples. While head driver 24 of control circuitry 22 applies current to laser unit 320 in various examples, NFT 316 is also energized by current applied to laser unit 320 by way of laser emission from laser unit 320 via NFT 316, such that NFT 316, or the portion of head 318 that collectively includes laser unit 320 and NFT 316, may also be considered an energizing component, in various examples. Various examples may also include other energizing components, such as a microwave transmitter, microwave unit, or other spin torque oscillator unit for use in microwave-assisted magnetic recording (MAMR), for example.

Control circuitry 22 measuring the relation of temperature of the applicable portion of head 18A relative to current applied to an energizing component, such as laser unit 320 and/or NFT 316, may thus include making a first temperature measurement of the applicable portion of head 18A, such as via NTS 324, at a first current applied to the energizing component; making a second temperature measurement of the of the applicable portion of head 18A, such as via NTS 324, at a second current applied to the energizing component; and determining a slope of temperature of the applicable portion of head 18A relative to current applied to the energizing component, based at least in part on the first temperature measurement of the applicable portion of head 18A at the first current applied to the energizing component and the second temperature measurement of the applicable portion of head 18A at the second current applied to the energizing component. Control circuitry 22 may make these measurements of temperature of the applicable portion of head 18A at any two or more values of current applied to the energizing component, at values of current above the laser threshold, and from these measurements of two or more pairs of values of current applied and temperature, determine the linear proportionality relation of current applied to temperature of the applicable portion of head 18A, equivalent to plotting a corresponding graph analogous to graphs 400, 500, and 600 of FIGS. 4-6. While these graphs are useful to convey the applicable concepts, control circuitry 22 may make determinations of this current-temperature relation, such as temperature as a function of applied current within the applicable range, and at a determined slope that is indicative of the heat dissipation of the applicable portion of head 18A, within software and hardware (without plotting a corresponding human-perceptible graph, which are shown herein to conceptually represent analyses and determinations made by control circuitry 22 and to aid in conceptual understanding).

Control circuitry 22 may make measurements and determinations applicable to the heat dissipation of the applicable portion of head 18A, including making measurements of the temperature of the applicable portion of head 18A relative to current applied to an energizing component of head 18A to determine the current-temperature relation that corresponds to the slope of temperature plotted against current, such as in FIGS. 4-6, on a more or less regular or otherwise ongoing basis, in various examples. Control circuitry 22 may make measurements and determinations applicable to the heat dissipation of the applicable portion of head 18A at more or less regular intervals, such as approximately every six or eight hours in some examples, or at intervals of more, similar, or fewer numbers of hours, or at intervals measured in minutes or shorter, or in days or longer, in different examples. The heat dissipation of the applicable portion of head 18A may evolve over time, and control circuitry 22 may track such evolution over time, and may potentially track the heat dissipation and/or related properties evolving out of nominal and into non-nominal over time, in various examples. Control circuitry 22 may also apply different priority levels to making measurements and determinations applicable to the heat dissipation of the applicable portion of head 18A relative to other tasks to perform with disk drive 15, and may wait for disk drive 15 to become more or less idle from active usage, or otherwise when disk drive 15 is being used at a relatively lower bandwidth of usage, to make measurements and determinations applicable to the heat dissipation of the applicable portion of head 18A. Control circuitry 22 may thus seek to ensure that analyzing the heat dissipation of the applicable portion of head 18A doesn't exert any detectable or non-negligible effect on the write and/or read performance of disk drive 15, such as may be measured in terms of inputs and outputs per second (IOPS), which may be measured in accordance with various sets of criteria, for example. In other cases, control circuitry 22 may elect to prioritize making measurements, determinations, analyses, and/or mitigation actions with regard to the heat dissipation of the applicable portion of head 18A.

If control circuitry 22 determines from the current-temperature relation that the heat dissipation of the applicable portion of head 18A has strayed out of nominal range and detects a non-nominal heat dissipation of the applicable portion of head 18A, control circuitry may determine one or more mitigation actions to perform or execute, and may perform or execute such one or more mitigation actions. In various examples, control circuitry 22 mitigating the non-nominal heat dissipation of the applicable portion of head 18A may include control circuitry 22 controlling one or more components of disk drive 15 to perform a mechanical mitigation, to apply a chemical mitigation, to raise a fly height of head 18A, and/or to perform any other mitigation action.

Performing a mechanical mitigation may include burnishing a surface of head 18A in the vicinity of NFT 316, in various examples. Control circuitry 22 controlling one or more components of disk drive 15 to burnish a surface of head 18A in the vicinity of NFT 316 may include control circuitry 22 controlling either or both of a burnishing component (not shown in the figures) and head 18A to mechanically contact each other in a manner that may tend to burnish, polish, exert friction upon, or otherwise contact a surface of head 18A in the vicinity of NFT 316, and/or in such a manner that may tend to remove matter that is extraneous or that may have accumulated on a surface of head 18A, and which may have altered the heat dissipation of the applicable surface of head 18A.

Applying a chemical mitigation may include control circuitry 22 controlling one or more components of disk drive 15 to apply an oxidizer into an ambient environment of head 18A, such that the oxidizer may come into contact with a surface of head 18A, including in the vicinity of NFT 316, and may chemically interact in such a way that may ameliorate the change in heat dissipation to non-nominal, in various examples. Control circuitry 22 controlling one or more components of disk drive 15 to apply an oxidizer into an ambient environment of head 18A may include control circuitry 22 controlling one or more components of disk drive 15 to admit or otherwise add oxygen into an internal environment of disk drive 15 or other data storage device. Such oxygen may or may not be added as part of atmospheric air and may be added only in a small amount, such as a fraction of normal Earth atmospheric oxygen content, into the internal environment of disk drive 15, which may otherwise be purged with helium, in various examples. Control circuitry 22 may also perform a chemical mitigation action by opening or engaging a chemical filter in the ambient environment of head 18A, which may include a chemical filtration material, such as platinum, palladium, or activated carbon, for example.

Control circuitry 22 may also carry out a mitigation for the non-nominal heat dissipation by raising a fly height of head 18A. Control circuitry 22 raising the fly height of head 18A may include introducing an increase of the fly height of head 18A superimposed on other fly height controls applied to head 18A. Systematically raising the fly height of head 18A in such a manner may compensate for added uncertainty in fly height due to a non-nominal heat dissipation and the uncertainty that exerts on the behavioral and/or other responses of head 18A to control signals from control circuitry 22. Control circuitry 22 may also perform and adjust other controls to compensate for systematically higher fly height, such as increase the intensity of the write signal to exert the same write strength on the corresponding disk surface from a greater fly height, for example.

Control circuitry 22 may monitor the effects of mitigation actions it carries out, make new measurements of the heat dissipation of the applicable portion of head 18A, determine whether the heat dissipation of the applicable portion of head 18A has returned to nominal or has at least partially improved closer to nominal, in various examples. For example, control circuitry 22 may be configured to perform a measurement of a post-mitigation relation of temperature of the applicable portion of head 18A as detected via NTS 324 relative to current applied to the energizing component, such as laser unit 320 and/or NFT 316. Control circuitry 22 may perform a comparison of the measured post-mitigation relation of temperature of the applicable portion of head 18A relative to current applied to the energizing component to the nominal reference relation of temperature of the applicable portion of head 18A relative to current applied to the energizing component.

Control circuitry 22 may thereby detect whether the measured post-mitigation relation of temperature of the applicable portion of head 18A relative to current applied to the energizing component is indicative of a return to the nominal heat dissipation. If control circuitry 22 detects that head 18A still persists with a non-nominal heat dissipation, then, in response to detecting that the measured post-mitigation relation of temperature of the applicable portion of head 18A relative to current applied to the energizing component is not indicative of a return to the nominal heat dissipation, control circuitry 22 may output an indication of non-nominal performance of head 18A. Such an indication output may also include an indication that disk drive 15 may be likely to fail in the relatively near future, and a suggestion to consider whether to back up all data from disk drive 15 onto one or more other data storage devices and to remove disk drive 15 from service, in various examples.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprises logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations fall within the scope of this disclosure. Certain method, event or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a CPU, an FPGA, a SoC, a measurement and control multiprocessor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
   one or more disks;
   a head, configured to be positioned proximate to a disk surface among the one or more disks;
   a temperature sensor; and
   one or more processing devices, configured to:
      detect, via the temperature sensor, a non-nominal heat dissipation of a portion of the head; and
      in response to detecting the non-nominal heat dissipation of the portion of the head, mitigate the non-nominal heat dissipation of the portion of the head.

2. The data storage device of claim 1, wherein detecting the non-nominal heat dissipation further comprises:
   measuring a relation of temperature of the portion of the head relative to current applied to an energizing component comprised in the portion of the head, thereby generating a measured relation of temperature of the portion of the head relative to current applied to the energizing component,
   wherein detecting the non-nominal heat dissipation of the portion of the head is based at least in part on the measured relation of temperature of the portion of the head relative to current applied to the energizing component.

3. The data storage device of claim 2, wherein detecting the non-nominal heat dissipation of the portion of the head comprises detecting a difference between the measured relation of temperature of the portion of the head relative to current applied to the energizing component, and a nominal reference relation of temperature of the portion of the head relative to current applied to the energizing component.

4. The data storage device of claim 2, wherein measuring the relation of temperature of the portion of the head relative to current applied to the energizing component comprises:
   making a first temperature measurement of the portion of the head at a first current applied to the energizing component;
   making a second temperature measurement of the portion of the head at a second current applied to the energizing component; and
   determining a slope of temperature of the portion of the head relative to current applied to the energizing component, based at least in part on the first temperature measurement of the portion of the head at the first current applied to the energizing component and the second temperature measurement of the portion of the head at the second current applied to the energizing component.

5. The data storage device of claim 2, wherein detecting the non-nominal heat dissipation further comprises:
measuring the relation of temperature of the portion of the head relative to current applied to the energizing component at two or more levels of fly height of the head above the disk surface; and
correcting for an effect on temperature of the portion of the head, based at least in part on the measured relation of temperature of the portion of the head relative to current applied to the energizing component at the two or more levels of fly height of the head above the disk surface.

6. The data storage device of claim 1, wherein the temperature sensor is positioned on the head proximate to an energizing component comprised in the portion of the head.

7. The data storage device of claim 6, wherein the energizing component comprises at least one of a laser unit and a near-field transmitter (NFT) coupled to the laser unit.

8. The data storage device of claim 6, wherein the energizing component comprises a microwave magnetic spin torque oscillator unit.

9. The data storage device of claim 1, wherein mitigating the non-nominal heat dissipation of the portion of the head comprises performing a mechanical mitigation.

10. The data storage device of claim 9, wherein performing the mechanical mitigation comprises burnishing a surface of the head in the vicinity of a near-field transmitter (NFT) comprised in the head.

11. The data storage device of claim 1, wherein mitigating the non-nominal heat dissipation of the portion of the head comprises applying a chemical mitigation.

12. The data storage device of claim 11, wherein applying the chemical mitigation comprises applying an oxidizer into an ambient environment of the head.

13. The data storage device of claim 1, wherein mitigating the non-nominal heat dissipation comprises raising a fly height of the head.

14. The data storage device of claim 1, wherein the one or more processing devices are further configured to:
perform a measurement of a post-mitigation relation of temperature of the portion of the head relative to current applied to an energizing component comprised in the portion of the head;
perform a comparison of the measured post-mitigation relation of temperature of the portion of the head relative to current applied to the energizing component to the nominal reference relation of temperature of the portion of the head relative to current applied to the energizing component, thereby detecting whether the measured post-mitigation relation of temperature of the portion of the head relative to current applied to the energizing component is indicative of a return to a nominal heat dissipation; and
in response to detecting that the measured post-mitigation relation of temperature of the portion of the head relative to current applied to the energizing component is not indicative of a return to the nominal heat dissipation, output an indication of non-nominal performance of the head.

15. The data storage device of claim 1, wherein the one or more processing devices being configured to detect the non-nominal heat dissipation of the portion of the head comprises the one or more processing devices being configured to detect the heat dissipation of the head evolving over time away from its nominal range of heat dissipation.

16. A method comprising:
detecting, by one or more processing devices, via a temperature sensor, a non-nominal heat dissipation of a portion of a head, wherein the head is configured to be positioned proximate to a disk surface among one or more disks; and
in response to detecting the non-nominal heat dissipation of the portion of the head, mitigating, by the one or more processing devices, the non-nominal heat dissipation of the portion of the head.

17. The method of claim 16, wherein detecting the non-nominal heat dissipation further comprises:
measuring a relation of temperature of the portion of the head relative to current applied to an energizing component comprised in the portion of the head, thereby generating a measured relation of temperature of the portion of the head relative to current applied to the energizing component,
wherein detecting the non-nominal heat dissipation of the portion of the head is based at least in part on the measured relation of temperature of the portion of the head relative to current applied to the energizing component.

18. The method of claim 17, wherein detecting the non-nominal heat dissipation of the portion of the head comprises detecting a difference between the measured relation of temperature of the portion of the head relative to current applied to the energizing component, and a nominal reference relation of temperature of the portion of the head relative to current applied to the energizing component,
and wherein measuring the relation of temperature of the portion of the head relative to current applied to the energizing component comprises:
making a first temperature measurement of the portion of the head at a first current applied to the energizing component;
making a second temperature measurement of the portion of the head at a second current applied to the energizing component; and
determining a slope of temperature of the portion of the head relative to current applied to the energizing component, based at least in part on the first temperature measurement of the portion of the head at the first current applied to the energizing component and the second temperature measurement of the portion of the head at the second current applied to the energizing component,
the method further comprising:
performing a measurement of a post-mitigation relation of temperature of the portion of the head relative to current applied to an energizing component comprised in the portion of the head;
performing a comparison of the measured post-mitigation relation of temperature of the portion of the head relative to current applied to the energizing component to the nominal reference relation of temperature of the portion of the head relative to current applied to the energizing component, thereby detecting whether the measured post-mitigation relation of temperature of the portion of the head relative to current applied to the energizing component is indicative of a return to a nominal heat dissipation; and
in response to detecting that the measured post-mitigation relation of temperature of the portion of the head relative to current applied to the energizing component is not indicative of a return to the nominal heat dissipation, outputting an indication of non-nominal performance of the head.

19. One or more processing devices comprising:
means for detecting, via a temperature sensor, a non-nominal heat dissipation of a portion of a head, wherein the head is configured to be positioned proximate to a disk surface among one or more disks; and
means for mitigating, in response to detecting the non-nominal heat dissipation of the portion of the head, the non-nominal heat dissipation of the portion of the head,
wherein the means for detecting the non-nominal heat dissipation further comprises:
means for measuring a relation of temperature of the portion of the head relative to current applied to an energizing component comprised in the portion of the head, thereby generating a measured relation of temperature of the portion of the head relative to current applied to the energizing component,
wherein detecting the non-nominal heat dissipation of the portion of the head is based at least in part on the measured relation of temperature of the portion of the head relative to current applied to the energizing component.

20. The one or more processing devices of claim 19, wherein the means for detecting the non-nominal heat dissipation of the portion of the head comprises means for detecting a difference between the measured relation of temperature of the portion of the head relative to current applied to the energizing component, and a nominal reference relation of temperature of the portion of the head relative to current applied to the energizing component,
and wherein measuring the relation of temperature of the portion of the head relative to current applied to the energizing component comprises:
means for making a first temperature measurement of the portion of the head at a first current applied to the energizing component, and making a second temperature measurement of the portion of the head at a second current applied to the energizing component; and
means for determining a slope of temperature of the portion of the head relative to current applied to the energizing component, based at least in part on the first temperature measurement of the portion of the head at the first current applied to the energizing component and the second temperature measurement of the portion of the head at the second current applied to the energizing component,
the one or more processing devices further comprising:
means for performing a measurement of a post-mitigation relation of temperature of the portion of the head relative to current applied to an energizing component comprised in the portion of the head;
means for performing a comparison of the measured post-mitigation relation of temperature of the portion of the head relative to current applied to the energizing component to the nominal reference relation of temperature of the portion of the head relative to current applied to the energizing component, thereby detecting whether the measured post-mitigation relation of temperature of the portion of the head relative to current applied to the energizing component is indicative of a return to a nominal heat dissipation; and
means for outputting, in response to detecting that the measured post-mitigation relation of temperature of the portion of the head relative to current applied to the energizing component is not indicative of a return to the nominal heat dissipation, an indication of non-nominal performance of the head.

* * * * *